United States Patent
Weismantel et al.

(10) Patent No.: US 8,742,026 B2
(45) Date of Patent: Jun. 3, 2014

(54) PROCESS FOR PRODUCING WATER-ABSORBING POLYMER PARTICLES WITH IMPROVED PERMEABILITY

(75) Inventors: Matthias Weismantel, Jossgrund-Oberndorf (DE); Markus Braun, Heidelberg (DE)

(73) Assignee: BASF SE, Ludwigshafen (DE)

( * ) Notice: Subject to any disclaimer, the term of this patent is extended or adjusted under 35 U.S.C. 154(b) by 151 days.

(21) Appl. No.: 13/411,273

(22) Filed: Mar. 2, 2012

(65) Prior Publication Data

US 2012/0231162 A1 Sep. 13, 2012

Related U.S. Application Data

(60) Provisional application No. 61/450,152, filed on Mar. 8, 2011.

(51) Int. Cl.
- C08F 20/02 (2006.01)
- C08F 20/56 (2006.01)
- C08F 8/00 (2006.01)
- C08F 2/00 (2006.01)

(52) U.S. Cl.
USPC ................ 525/329.7; 525/329.4; 525/330.2; 525/374; 525/375; 525/384; 526/88; 526/73; 526/65; 526/303.1; 526/317.1

(58) Field of Classification Search
USPC ........ 525/329.7, 329.4, 330.2, 374, 375, 384; 526/65, 73, 88, 303.1, 317.1
See application file for complete search history.

(56) References Cited

U.S. PATENT DOCUMENTS

| | | | |
|---|---|---|---|
| 6,254,990 B1 * | 7/2001 | Ishizaki et al. | 428/402 |
| 8,188,163 B2 * | 5/2012 | Matsumoto et al. | 523/330 |
| 8,410,222 B2 * | 4/2013 | Funk et al. | 525/329.7 |
| 2009/0022603 A1 * | 1/2009 | Feise et al. | 417/55 |

FOREIGN PATENT DOCUMENTS

| EP | 1 029 886 A2 | 8/2000 |
|---|---|---|
| WO | WO 2009028568 A1 * | 3/2009 |
| WO | WO 2010006937 A1 * | 1/2010 |

OTHER PUBLICATIONS

Buchholz, Fredric L., et al. *Modern Superabsorbent Polymer Technology*, "Solution Polymerization: Unit Operations and Their Effect on Product Quality." New York: John Wiley & Sons, Inc., 1998, pp. 71-103.

* cited by examiner

*Primary Examiner* — Michael M Bernshteyn
(74) *Attorney, Agent, or Firm* — Marshall, Gerstein & Borun LLP

(57) ABSTRACT

The invention relates to a process for producing water-absorbing polymer particles with improved permeability, comprising the steps of polymerization, drying, grinding, classification and thermal surface postcrosslinking, with pneumatic conveying between grinding and classification.

13 Claims, No Drawings

PROCESS FOR PRODUCING WATER-ABSORBING POLYMER PARTICLES WITH IMPROVED PERMEABILITY

CROSS-REFERENCE TO RELATED APPLICATIONS

This application claims the benefit of U.S. provisional Patent Application No. 61/450,152, filed Mar. 8, 2011, incorporated by reference herein in its entirety.

The present invention relates to a process for producing water-absorbing polymer particles with improved permeability, comprising the steps of polymerization, drying, grinding, classification and thermal surface postcrosslinking, with pneumatic conveying between grinding and classification.

Water-absorbing polymer particles are used to produce diapers, tampons, sanitary napkins and other hygiene articles, but also as water-retaining agents in market gardening. The water-absorbing polymer particles are often also referred to as "absorbent resins", "superabsorbents", "superabsorbent polymers", "absorbent polymers", "absorbent gelling materials", "hydrophilic polymers" or "hydrogels".

The production of water-absorbing polymer particles is described in the monograph "Modern Superabsorbent Polymer Technology", F. L. Buchholz and A. T. Graham, Wiley-VCH, 1998, pages 71 to 103.

The properties of the water-absorbing polymer particles can be adjusted, for example, via the amount of crosslinker used. With an increasing amount of crosslinker, the centrifuge retention capacity (CRC) falls and the absorption under a pressure of 21.0 g/cm$^2$ (AUL0.3 psi) passes through a maximum.

To improve the performance properties, for example, saline flow conductivity (SFC) and absorption under a pressure of 49.2 g/cm$^2$ (AUL0.7 psi), water-absorbing polymer particles are generally surface postcrosslinked. This increases the crosslinking of the particle surface, which can at least partly decouple the absorption under a pressure of 49.2 g/cm$^2$ (AUL0.7 psi) and the centrifuge retention capacity (CRC). This surface postcrosslinking can be performed in aqueous gel phase. Preferably, however, dried, ground and sieved polymer particles (base polymer) are surface coated with a surface postcrosslinker, thermally surface postcrosslinked and dried. Crosslinkers suitable for that purpose are compounds which can form covalent bonds to at least two carboxylate groups of the water-absorbing polymer particles.

According to EP 1 029 886 A2, the permeability of surface postcrosslinked water-absorbing polymer particles can be improved by grinding the polymer particles before the surface postcrosslinking until a particular minimum bulk density is attained.

It was an object of the present invention to provide a process for producing water-absorbing polymer particles with improved saline flow conductivity (SFC).

The object was achieved by a process for producing water-absorbing polymer particles with improved permeability, comprising i) polymerization of a monomer solution or suspension comprising
   a) at least one ethylenically unsaturated monomer which bears acid groups and may be at least partly neutralized,
   b) at least one crosslinker,
   c) at least one initiator,
   d) optionally one or more ethylenically unsaturated monomers copolymerizable with the monomers mentioned under a) and
   e) optionally one or more water-soluble polymers, ii) drying the resulting polymer gel,
iii) grinding the dried polymer gel to give polymer particles,
iv) classifying the polymer particles and
v) thermally surface postcrosslinking the classified polymer particles, wherein the polymer particles are pneumatically conveyed after step iii) and before step iv).

In principle, there are three distinct types of pneumatic conveying:

In dilute phase conveying, in the range of high gas velocities, the laws of the free-flowing individual particle apply as an approximation. This is the conventional type of pneumatic conveying. No product deposits whatsoever occur. There is essentially homogeneous distribution of conveyed material in the conveying pipe.

If the gas velocity falls, the conveying moves into the range of fluidized dilute phase delivery, where the conveyed material flows in the lower half of the conveying pipe in particular. In the upper half of the conveying pipe, dilute phase conveying is present.

At low gas velocities, conveying is effected exceptionally gently in the form of dense phase conveying (plug conveying, pulse conveying) with high pressure drop.

In principle, pressure conveying can work with slower conveying rates than suction conveying, since the pressure reserves are greater under elevated pressure than under reduced pressure, and since the conveying gas density which drives the product onward rises with increasing pressure.

Since conveying gas is compressible, there is not a constant pressure in the conveying pipe, but rather a higher pressure at the start than at the end. However, the gas volume also changes as a result, such that, at the start, slower gas velocities predominate at higher pressure and, at the end, higher gas velocities at lower pressure.

Excessively low conveying rates in the range of fluidized dilute phase conveying are problematic, since stable conveying is not possible in the unstable range between dense phase conveying and fluidized dilute phase conveying. Instead, the mechanical stresses which occur can lead to severe damage to the conveying system, to the extent of tearing of the conveying pipes out of the mounts.

The optimal initial gas velocity in the pneumatic conveying depends on the diameter of the conveying pipe. This dependence is best described by the Froude number:

$$Fr = \frac{v}{\sqrt{D \times g}}$$

Fr Froude number
v gas velocity
D internal diameter of the transport pipe
g acceleration due to gravity The Froude number in the inventive pneumatic conveying is preferably from 10 to 40, more preferably from 15 to 35 and most preferably from 20 to 30. Adherence to the optimal Froude number has an advantageous effect on abrasion during the pneumatic conveying.

The loading of conveyed material in the pneumatic conveying is preferably from 0.5 to 20 kg/kg, more preferably from 1 to 10 kg/kg and most preferably from 2 to 6 kg/kg, where the loading of conveyed material is the quotient of mass flow rate of conveyed material and gas mass flow rate.

In principle, the optimal initial gas velocity also increases with rising loading of conveyed material.

Preferred compressors for the inventive pneumatic conveying are forced compressors. A particularly suitable forced compressor with a steep characteristic is a positive displacement blower.

The diameter of the conveying pipe is preferably from 3 to 30 cm, more preferably from 4 to 25 cm and most preferably from 5 to 20 cm.

Advantageously, the polymer particles are deflected repeatedly in the course of pneumatic conveying, preferably at least three times, more preferably at least five times and most preferably at least ten times, for example by means of corresponding curves in the conveying pipe. The curves are connections between straight sections of the conveying pipe, the angle formed by the straight sections being about 90°. Deflection has an advantageous effect on abrasion during the pneumatic conveying. The conveying pipe is the section between the introduction unit for the water-absorbing polymer particles and the receiver vessel, i.e. the region within which the water-absorbing polymer particles are transported in the gas stream.

The present invention is based on the finding that the saline flow conductivity (SFC) of the water-absorbing polymer particles can be improved by pneumatically conveying the polymer particles after the grinding and before the surface postcrosslinking. This is surprising especially because the abrasion associated with the pneumatic conveying does not yet lead to significant changes in the properties of the base polymer. Excessive mechanical stress leads to a deterioration in the product properties and should be avoided, which means that the Froude number in the pneumatic delivery and the number of curves should be matched to one another.

The moisture content of the water-absorbing polymer particles during the pneumatic conveying is preferably from 0.5 to 10% by weight, more preferably from 1 to 7% by weight and most preferably from 2 to 5% by weight, the moisture content being determined by EDANA recommended test method No. WSP 230.2-02 "Mass Loss Upon Heating". Excessively high moisture contents during the pneumatic conveying can lead to plastic deformation of the polymer particles (formation of "angel hair") or to blockages. At excessively low moisture contents, the polymer particles become too brittle.

The pneumatically conveyed polymer particles have a centrifuge retention capacity (CRC) of preferably 30 to 45 g/g, more preferably of 32 to 40 g/g and most preferably of 34 to 38 g/g. The centrifuge retention capacity (CRC) is determined by EDANA recommended test method No. WSP 241.2-05 "Fluid Retention Capacity in Saline, After Centrifugation". Adherence to the optimal centrifuge retention capacity (CRC) has an advantageous effect on abrasion during the pneumatic conveying. At excessively low centrifuge retention capacity (CRC) the polymer particles are too brittle, and at excessively high centrifuge retention capacity (CRC) too soft.

The acid groups of the pneumatically conveyed polymer particles have preferably been 50 to 90 mol %, more preferably from 60 to 85 mol % and most preferably from 65 to 80 mol % neutralized. Adherence to the optimal degree of neutralization likewise has an advantageous effect on abrasion during the pneumatic conveying. At an excessively high degree of neutralization the polymer particles are too brittle, and at an excessively low degree of neutralization too soft.

The production of the water-absorbing polymer particles is described in detail hereinafter:

The water-absorbing polymer particles are produced by polymerizing a monomer solution or suspension, and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water and most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized freeradically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight and most preferably 0.3 to 0.6% by weight, based in each case on monomer a). With rising crosslinker content, the centrifuge retention capacity (CRC) falls and the absorption under a pressure of 21.0 g/cm$^2$ passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. However, the reducing component used is preferably disodium 2-hydroxy-2-sulfonatoacetate or a mixture of disodium 2-hydroxy-2-sulfinatoacetate, disodium 2-hydroxy-2-sulfonatoacetate and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess monomer a), for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

For better control of the polymerization reaction, it is optionally possible to add all known chelating agents to the monomer solution or suspension or to the raw materials thereof. Suitable chelating agents are, for example, phosphoric acid, diphosphoric acid, triphosphoric acid, polyphosphoric acid, citric acid, tartaric acid, or salts thereof.

Further suitable examples are iminodiacetic acid, hydroxyethyliminodiacetic acid, nitrilotriacetic acid, nitrilotripropionic acid, ethylenediaminetetraacetic acid, diethylenetriaminepentaacetic acid, triethylenetetraaminehexaacetic acid, N,N-bis(2-hydroxyethyl)glycine and trans-1,2-diaminocyclohexanetetraacetic acid, and salts thereof. The amount used is typically 1 to 30 000 ppm based on the monomers i), preferably 10 to 1000 ppm, preferentially 20 to 600 ppm, more preferably 50 to 400 ppm, most preferably 100 to 300 ppm.

In step i), the monomer solution or suspension is polymerized. Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on the belt is described, for example, in DE 38 25 366 A1 and U.S. Pat. No. 6,241,928. Polymerization in a belt reactor forms a polymer gel which has to be comminuted in a further process step, for example in an extruder or kneader.

To improve the drying properties, the comminuted polymer gel obtained by means of a kneader can additionally be extruded.

However, it is also possible to dropletize an aqueous monomer solution and to polymerize the droplets obtained in a heated carrier gas stream. It is possible here to combine the steps of polymerization i) and drying ii), as described in WO 2008/040715 A2 and WO 2008/052971 A1.

The acid groups of the resulting polymer gels have typically been partially neutralized. Neutralization is preferably carried out at the monomer stage. This is typically accomplished by mixing in the neutralizing agent as an aqueous solution or preferably also as a solid. The degree of neutralization is preferably from 50 to 90 mol %, more preferably from 60 to 85 mol % and most preferably from 65 to 80 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

In step ii), the resulting polymer gel is dried. The driers are not subject to any restriction. However, the drying of the polymer gel is preferably performed with a belt drier until the residual moisture content is preferably 0.5 to 10% by weight, more preferably 1 to 7% by weight and most preferably 2 to 5% by weight, the residual moisture content being determined by EDANA recommended test method No. WSP 230.2-05 "Mass Loss Upon Heating". In the case of too high a residual moisture content, the dried polymer gel has too low a glass transition temperature $T_g$ and can be processed further only with difficulty. In the case of too low a residual moisture content, the dried polymer gel is too brittle and, in the subsequent grinding steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. However, a fluidized bed drier or a paddle drier may optionally also be used for drying purposes.

Subsequently, the dried polymer gel is ground and classified in steps iii) and iv), and the apparatus used for grinding may typically be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm and very particularly from 300 to 500 µm. The mean particle size of the product fraction may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 µm is preferably at least 90% by weight, more preferably at least 95% by weight, most preferably at least 98% by weight.

Polymer particles with too small a particle size lower the saline flow conductivity (SFC). The proportion of excessively small polymer particles ("fines") should therefore be low.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated for, for example, by adjusting the amount of crosslinker b) used.

When the excessively small polymer particles are added at a very late stage, for example not until an apparatus connected downstream of the polymerization reactor, for example an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 µm is preferably at least 90% by weight, more preferably at least 95% by weight, most preferably at least 98% by weight.

The proportion of particles having a particle size of at most 600 µm is preferably at least 90% by weight, more preferably at least 95% by weight, most preferably at least 98% by weight.

Polymer particles of excessively large particle size lower the free swell rate. The proportion of excessively large polymer particles should therefore likewise be small.

Excessively large polymer particles are therefore typically removed and recycled into the grinding of the dried polymer gel.

To improve the properties, the polymer particles are thermally surface postcrosslinked in step v). Suitable surface postcrosslinkers are compounds which comprise groups which can form covalent bonds with at least two acid groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239, 230.

Additionally described as suitable surface postcrosslinkers are cyclic carbonates in DE 40 20 780 C1, 2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyloxazolidin-2-one, oxazolidin-2-one and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001 to 2% by weight, more preferably 0.02 to 1% by weight and most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking, i.e. after step iv).

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight and more preferably 0.02 to 0.8% by weight, based in each case on the polymer particles.

The surface postcrosslinking is typically performed in such a way that a solution of the surface postcrosslinker is sprayed onto the dried polymer particles. After the spray application, the polymer particles coated with surface postcrosslinker are dried thermally, and the surface postcrosslinking reaction can take place either before or during the drying.

The spray application of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The thermal surface postcrosslinking is preferably performed in contact driers, more preferably paddle driers, most preferably disk driers. Suitable driers are, for example, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany) and Nara Paddle Dryer (NARA Machinery Europe; Frechen; Germany). Moreover, fluidized bed driers may also be used.

The thermal surface postcrosslinking can be effected in the mixer itself, by heating the jacket or blowing in warm air. Equally suitable is a downstream drier, for example a shelf drier, a rotary tube oven or a heatable screw. It is particularly advantageous to effect mixing and drying in a fluidized bed drier.

Preferred surface postcrosslinking temperatures are in the range of 100 to 250° C., preferably 120 to 220° C., more preferably 130 to 210° C. and most preferably 150 to 200° C. The preferred residence time at this temperature in the reaction mixer or drier is preferably at least 10 minutes, more preferably at least 20 minutes, most preferably at least 30 minutes, and typically at most 60 minutes.

Subsequently, the surface postcrosslinked polymer particles can be classified again, excessively small and/or excessively large polymer particles being removed and recycled into the process.

To further improve the properties, the surface postcrosslinked polymer particles can be coated or remoisturized.

The remoisturizing is preferably performed at 30 to 80° C., more preferably at 35 to 70° C., most preferably at 40 to 60° C. At excessively low temperatures, the water-absorbing polymer particles tend to form lumps, and, at higher temperatures, water already evaporates to a noticeable degree. The amount of water used for remoisturizing is preferably from 1 to 10% by weight, more preferably from 2 to 8% by weight and most preferably from 3 to 5% by weight. The remoisturizing increases the mechanical stability of the polymer particles and reduces their tendency to static charging.

Suitable coatings for improving the free swell rate and the saline flow conductivity (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The water-absorbing polymer particles produced by the process according to the invention have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the water-absorbing polymer particles is typically less than 60 g/g. The centrifuge retention capacity (CRC) is determined by EDANA recommended test method No. WSP 241.2-05 "Fluid Retention Capacity in Saline, After Centrifugation".

The water-absorbing polymer particles produced by the process according to the invention have an absorption under a pressure of 49.2 g/cm$^2$ of typically at least 15 g/g, preferably at least 20 g/g, more preferably at least 22 g/g, especially preferably at least 24 g/g and most preferably at least 26 g/g. The absorption under a pressure of 49.2 g/cm$^2$ of the water-absorbing polymer particles is typically less than 35 g/g. The absorption under a pressure of 49.2 g/cm$^2$ is determined analogously to EDANA recommended test method No. WSP 242.2-05 "Absorption under Pressure, Gravimetric Determination", except that a pressure of 49.2 g/cm$^2$ is established instead of a pressure of 21.0 g/cm$^2$.

The water-absorbing polymer particles are tested by means of the test methods described below.

The standard test methods designated "WSP" are described in: "Standard Test Methods for the Nonwovens Industry", 2005 edition, published jointly by the Worldwide Strategic Partners EDANA (Avenue Eugène Plasky, 157, 1030 Brussels, Belgium, www.edana.org) and INDA (1100 Crescent Green, Cary, N.C. 27518, U.S.A., www.inda.org). This publication is available both from EDANA and from INDA.

Methods

The measurements should, unless stated otherwise, be conducted at an ambient temperature of 23±2° C. and a relative air humidity of 50±10%. The water-absorbing polymer particles are mixed thoroughly before the measurement.

pH

The pH of the water-absorbing polymer particles is determined by EDANA recommended test method No. WSP 200.2-02 "pH of Polyacrylate (PA) Powders".

Residual Monomers

The residual monomer content of the water-absorbing polymer particles is determined by EDANA recommended test method WSP No. 210.2-02 "Residual Monomers".

Moisture Content

The moisture content of the water-absorbing polymer particles is determined by EDANA recommended test method No. WSP 230.2-02 "Mass Loss Upon Heating".

Centrifuge Retention Capacity

The centrifuge retention capacity (CRC) is determined by EDANA recommended test method No. WSP 241.2-05 "Fluid Retention Capacity in Saline, After Centrifugation".

Absorption Under a Pressure of 21.0 g/cm² (Absorption Under Load)

The absorption under a pressure of 21.0 g/cm² (AUL0.3 psi) of the water-absorbing polymer particles is determined by EDANA recommended test method No. WSP 242.2-05 "Absorption under Pressure, Gravimetric Determination".

Absorption Under a Pressure of 49.2 g/cm² (Absorption Under Load)

The absorption under a pressure of 49.2 g/cm² (AUL0.7 psi) is determined analogously to EDANA recommended test method No. WSP 242.2-05 "Absorption Under Pressure, Gravimetric Determination", except that a pressure of 49.2 g/cm² (AUL0.7 psi) is established instead of a pressure of 21.0 g/cm² (AUL0.3 psi).

Bulk Density

The bulk density is determined by EDANA recommended test method No. WSP 260.2-05 "Density, Gravimetric Determination".

Extractables

The content of extractables of the water-absorbing polymer particles is determined by EDANA recommended test method No. WSP 270.2-05 "Extractable".

Free Swell Rate

To determine the free swell rate (FSR), 1.00 g (=W1) of the water-absorbing polymer particles is weighed into a 25 ml beaker and distributed homogeneously over its base. Then 20 ml of a 0.9% by weight sodium chloride solution are metered into a second beaker by means of a dispenser and the contents of this beaker are added rapidly to the first and a stopwatch is started. As soon as the last drop of salt solution has been absorbed, which is recognized by the disappearance of the reflection on the liquid surface, the stopwatch is stopped. The exact amount of liquid which has been poured out of the second beaker and absorbed by the polymer in the first beaker is determined accurately by reweighing the second beaker (=W2). The time interval required for the absorption, which has been measured with the stopwatch, is designated as t. The disappearance of the last liquid droplet on the surface is determined as the time t.

The free swell rate (FSR) is calculated therefrom as follows:

$$FSR\ [g/(g\ s)] = W2/(W1 \times t)$$

If the moisture content of the water-absorbing polymer particles, however, is more than 3% by weight, the weight W1 should be corrected to take account of this moisture content.

Saline Flow Conductivity

The saline flow conductivity (SFC) of a swollen gel layer under a pressure of 0.3 psi (2070 Pa) is, as described in EP 0 640 330 A1, determined as the gel layer permeability of a swollen gel layer of water-absorbing polymer particles, the apparatus described on page 19 and in FIG. 8 in the cited patent application having been modified such that the glass frit (40) is not used, and the plunger (39) consists of the same polymer material as the cylinder (37) and now comprises 21 bores of equal size distributed homogeneously over the entire contact area. The procedure and evaluation of the measurement remain unchanged from EP 0 640 330 A1. The flow is detected automatically.

The saline flow conductivity (SFC) is calculated as follows:

$$SFC\ [cm^3 s/g] = (Fg(t=0) \times L0)/(d \times A \times WP)$$

where $Fg(t=0)$ is the flow of NaCl solution in g/s, which is obtained using linear regression analysis of the $Fg(t)$ data of the flow determinations by extrapolation to $t=0$, L0 is the thickness of the gel layer in cm, d is the density of the NaCl solution in g/cm³, A is the area of the gel layer in cm², and WP is the hydrostatic pressure over the gel layer in dyn/cm².

EXAMPLES

Production of the Base Polymer

Example 1 (Comparative Example)

By continuously mixing water, 50% by weight sodium hydroxide solution and acrylic acid, a 38.8% by weight acrylic acid/sodium acrylate solution was prepared such that the degree of neutralization was 69.0 mol %. After the components had been mixed, the monomer solution was cooled continuously to a temperature of 30° C. by means of a heat exchanger and degassed with nitrogen. The polyethylenically unsaturated crosslinker used was 3-tuply ethoxylated glyceryl triacrylate (purity approx. 85% by weight). The amount used, based on the acrylic acid used, was 0.35% by weight. To initiate the free-radical polymerization, the following components were used: hydrogen peroxide (0.002% by weight of a 2.5% by weight aqueous solution), sodium peroxodisulfate (0.1% by weight of a 15% by weight aqueous solution), and ascorbic acid (0.01% by weight of a 0.5% by weight aqueous solution). The percentages by weight are based in turn on the acrylic acid used. The throughput of the monomer solution was 500 kg/h.

The individual components were metered continuously into a List ORP 250 Contikneter continuous kneader reactor (LIST AG, Arisdorf, Switzerland). In the first third of the reactor, 15 kg/h of removed undersize with a particle size of less than 150 µm were additionally added.

The reaction solution at the feed point had a temperature of 30° C. The residence time of the reaction mixture in the reactor was approx. 15 minutes. The resulting aqueous polymer gel comprised 0.03% by weight of residual monomers (based on solids content).

After polymerization and gel comminution, the aqueous polymer gel was placed onto a belt drier. A total of 480 kg/h of aqueous polymer gel with a water content of 42% by weight were dried. The gel was applied to the conveyor belt of the drier from a height of 30 cm by means of a swivel belt. The height of the gel layer was approx. 8 cm. The residence time on the conveyor belt of the belt drier was approx. 20 minutes.

The dried polymer gel was ground and classified by means of a roll mill. The fraction with a particle size of 200 to 710 µm was analyzed (base polymer A):

CRC: 37.6 g/g
AUL0.3 psi: 10.4 g/g
FSR: 0.28 g/(g s)
Moisture content: 3.6% by weight Extractables: 12.6% by weight
pH: 5.7
Residual monomers: 406 ppm by weight Example 2

The procedure of example 1 was repeated. After the grinding and before the classification, the water-absorbing polymer particles were additionally pneumatically conveyed. The conveying pipe used was a pipeline with a total length of 121 m. The internal diameter of the conveying pipe in the upstream region was 162.5 mm and in the downstream region 212.7 mm. The upstream region of the conveying pipe had a length of 97 m and a vertical elevation of 39 m. The Froude number at the start of the upstream region was 17.2. The downstream region of the conveying pipe had a length of 24 m and no vertical elevation. The Froude number at the start of the downstream region was 8.8. The ratio of radius of curvature to pipe diameter of the curves was 10 in each case. The fraction with a particle size of 200 to 710 μm was analyzed (base polymer B):
CRC: 37.6 g/g
AUL0.3 psi: 10.0 g/g
FSR: 0.28 g/(g s)
Moisture content: 3.5% by weight
Extractables: 12.6% by weight
pH: 5.8
Residual monomers: 370 ppm by weight Surface Postcrosslinking Example 3 (Comparative Example)

Base polymer A from example 1 was coated in an Pflugschar M5 plowshare mixer with heating jacket (Gebr. Lödige Maschinenbau GmbH; Paderborn, Germany) at 23° C. and a shaft speed of 450 revolutions per minute by means of a two-substance spray nozzle with a mixture of 0.07% by weight of N-hydroxyethyl-2-oxazolidinone, 0.07% by weight of 1,3-propanediol, 0.7% by weight of propylene glycol, 2.27% by weight of a 22% by weight aqueous aluminum lactate solution, 0.448% by weight of a 0.9% by weight aqueous sorbitan monolaurate solution and 0.992% by weight of isopropanol, based in each case on base polymer A.

After the spray application, the product temperature was increased to 185° C. and the reaction mixture was held at this temperature and a shaft speed of 80 revolutions per minute for 50 minutes. The resulting product was cooled to ambient temperature and classified again. The fraction with a particle size of 200 to 710 μm was analyzed:
CRC: 26.8 g/g
AUL0.7 psi: 23.6 g/g
FSR: 0.12 g/(g s)
SFC: 110×10$^{-7}$ cm$^3$ s/g
Bulk density: 0.64 g/cm$^3$ 50 g of the resulting surface postcrosslinked water-absorbing polymer particles were mechanically stressed in a ball mill at 150 revolutions per minute for 5 minutes. The ball mill comprised 23 ceramic bodies with round caps (each approx. 5.52 g). The mechanically stressed polymer particles were analyzed:
CRC: 26.5 g/g
AUL0.7 psi: 23.3 g/g
FSR: 0.12 g/(g s)
SFC: 100×10$^{-7}$ cm$^3$ s/g
Bulk density: 0.64 g/cm$^3$ Example 4

The procedure of example 3 was repeated. Base polymer B was used instead of base polymer A. The resulting polymer particles were analyzed:
CRC: 26.4 g/g
AUL0.7 psi: 23.1 g/g
FSR: 0.12 g/(g s)
SFC: 119×10$^{-7}$ cm$^3$ s/g
Bulk density: 0.65 g/cm$^3$ Subsequently, the polymer particles were likewise mechanically stressed and analyzed again:
CRC: 26.4 g/g
AUL0.7 psi: 22.7 g/g
FSR: 0.13 g/(g s)
SFC: 108×10$^{-7}$ cm$^3$ s/g
Bulk density: 0.65 g/cm$^3$ The results show that the saline flow conductivity (SFC) can be enhanced significantly by the inventive pneumatic conveying. It is thus possible, for example, to compensate for the mechanical stress which will inevitably occur later when the diaper is manufactured (example 3 before mechanical stress compared to example 4 after mechanical stress).

This result of the inventive pneumatic conveying is especially surprising because the polymer particles B pretreated in accordance with the invention are no different than the polymer particles A not pretreated in accordance with the invention in terms of the analyzed values; more particularly, the bulk densities remain the same within the measurement error.

What is claimed:

1. A process for producing water-absorbing polymer particles with improved permeability comprising
    i) polymerization of a monomer solution or suspension comprising
        a) at least one ethylenically unsaturated monomer which bears acid groups and optionally is at least partly neutralized,
        b) at least one crosslinker,
        c) at least one initiator,
        d) optionally one or more ethylenically unsaturated monomers copolymerizable with the monomers mentioned under a) and
        e) optionally one or more water-soluble polymers,
    ii) drying the resulting polymer gel,
    iii) grinding the dried polymer gel to give polymer particles,
    iv) classifying the polymer particles, and
    v) thermally surface postcrosslinking the classified polymer particles, wherein the polymer particles are pneumatically conveyed after step iii) and before step iv), and wherein an initial gas velocity in the pneumatic conveying corresponds to a Froude number of at least 20.

2. The process according to claim 1, wherein the polymer particles are deflected repeatedly during the pneumatic conveying.

3. The process according to claim 2, wherein the polymer particles are deflected at least five times during the pneumatic conveying.

4. The process according claim 1, wherein the pneumatically conveyed polymer particles have a moisture content of 0.5 to 10% by weight.

5. The process according to claim 4, wherein the pneumatically conveyed polymer particles have a moisture content of 2 to 5% by weight.

6. The process according to claim 1, wherein the pneumatically conveyed polymer particles have a centrifuge retention capacity of 30 to 45 g/g.

7. The process according to claim 6, wherein the pneumatically conveyed polymer particles have a centrifuge retention capacity of 34 to 38 g/g.

8. The process according to claim 1, wherein the acid groups of the pneumatically conveyed polymer particles have been neutralized to an extent of at least 50 mol %.

9. The process according to claim 1, wherein the acid groups of the pneumatically conveyed polymer particles have been neutralized to an extent of at least 65 mol %.

10. The process according to claim 1, wherein the monomer a) is acrylic acid.

11. The process according to claim 1, wherein the surface postcrosslinking v) is accomplished using a compound that forms covalent bonds with at least two acid groups of the polymer particles.

12. The process according to claim 1, wherein the polymer particles after step iv) are coated with polyvalent metal cations.

13. The process according to claim 12, wherein the polyvalent metal cations are aluminum cations.

* * * * *